(12) United States Patent
Bear

(10) Patent No.: US 6,209,216 B1
(45) Date of Patent: Apr. 3, 2001

(54) METHODS AND APPARATUS FOR MEASURING AIRFOIL COORDINATES

(75) Inventor: Lowell L. Bear, West Chester, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/375,108

(22) Filed: Aug. 16, 1999

(51) Int. Cl.[7] .................................................. G01B 11/24
(52) U.S. Cl. .............................. 33/530; 33/833; 33/551; 250/559.22; 356/376
(58) Field of Search .................... 33/530, 1 BB, 33/832, 833, 531, 532, 545, 546, 549, 551, 552, 553, 554, 555; 250/559.01, 559.19, 559.2, 559.22, 559.23, 559.24, 559.26, 559.27; 356/376, 377, 387

(56) References Cited

U.S. PATENT DOCUMENTS

| | | | |
|---|---|---|---|
| 2,977,533 | * 3/1961 | Savage | 33/551 |
| 3,101,552 | * 8/1963 | Tandler et al. | 33/555 |
| 4,373,804 | 2/1983 | Pryor et al. | 356/376 |
| 4,721,388 | 1/1988 | Takagi et al. | 356/376 |
| 4,811,253 | 3/1989 | Johns . | |
| 4,908,782 | * 3/1990 | Pekarek et al. | 33/546 |
| 5,152,070 | * 10/1992 | Sorokes | 33/530 |
| 5,162,659 | 11/1992 | Diamond et al. | 356/376 |
| 5,175,601 | 12/1992 | Fitts | 356/376 |
| 5,444,536 | 8/1995 | Satzger et al. | 356/376 |
| 5,625,958 | * 5/1997 | DeCoursey et al. | 33/833 |
| 5,866,915 | 2/1999 | Pryor et al. | 250/559.2 |
| 5,873,566 | 2/1999 | Cadwallader et al. . | |

* cited by examiner

Primary Examiner—Christopher W. Fulton
(74) Attorney, Agent, or Firm—Andrew C. Hess; Nathan D. Herkamp

(57) ABSTRACT

An airfoil blade measuring apparatus includes an airfoil blade engagement system and a measuring system. The airfoil blade engagement system rotates the mounted airfoil blade to a position to be measured, and elevates the airfoil blade to permit the entire airfoil blade to be easily measured. The measuring system includes a blade engagement tool which positions the airfoil blade, a limit switch, two alignment slides, and a measuring slide including a plurality of laser displacement sensors, which are positioned via a computer controlled motor.

20 Claims, 2 Drawing Sheets

METHODS AND APPARATUS FOR MEASURING AIRFOIL COORDINATES

BACKGROUND OF THE INVENTION

This invention relates generally to airfoil blades and, more particularly, to measuring airfoil blade coordinates.

Airfoil blade edge shapes are critical in turbomachinery which operates at high revolutions per minute, or under high pressure or high temperature conditions. High performance of the airfoil blades enhances the turbomachine efficiency. Accurately determining the dimensions, locations, and attitudes of airfoil blade edges and surfaces facilitates enhancing blade performance.

Airfoil blade measuring systems typically include an airfoil blade positioning apparatus and a separate measuring system. Digital cameras, modified microscopes, or coordinate measuring machines are used to measure blade dimensions, locations, and attitudes. Such cameras, microscopes, and measuring machines do not provide the desired accuracy and reliability, and are expensive, bulky, and slow to produce results.

BRIEF SUMMARY OF THE INVENTION

In an exemplary embodiment, an airfoil measuring system includes two movable alignment slides, and one moveable measurement slide, which are controlled by the computer, and a pair of laser displacement sensors of appropriate range, resolution and accuracy, which receive and emit laser energy signals. A blade engagement tool is mounted to one of the alignment slides and includes a notch which engages and aligns the airfoil blade edge to be measured. The movement of the first and second alignment slides is controlled by a limit switch assembly which, when engaged, causes the two alignment slides to retract after the airfoil blade has been properly aligned.

In operation, the measurement slide moves the laser displacement sensors while the sensors are measuring the edge coordinates and transmitting the measurements back to the computer. The measurements are then repeated at several spanwise elevations along the blade edge. As a result, the airfoil measuring apparatus eliminates more costly and more complicated known blade positioning equipment and provides a system that is highly accurate, reliable, and cost-effective.

DETAILED DESCRIPTION OF THE INVENTION

Figure 1:
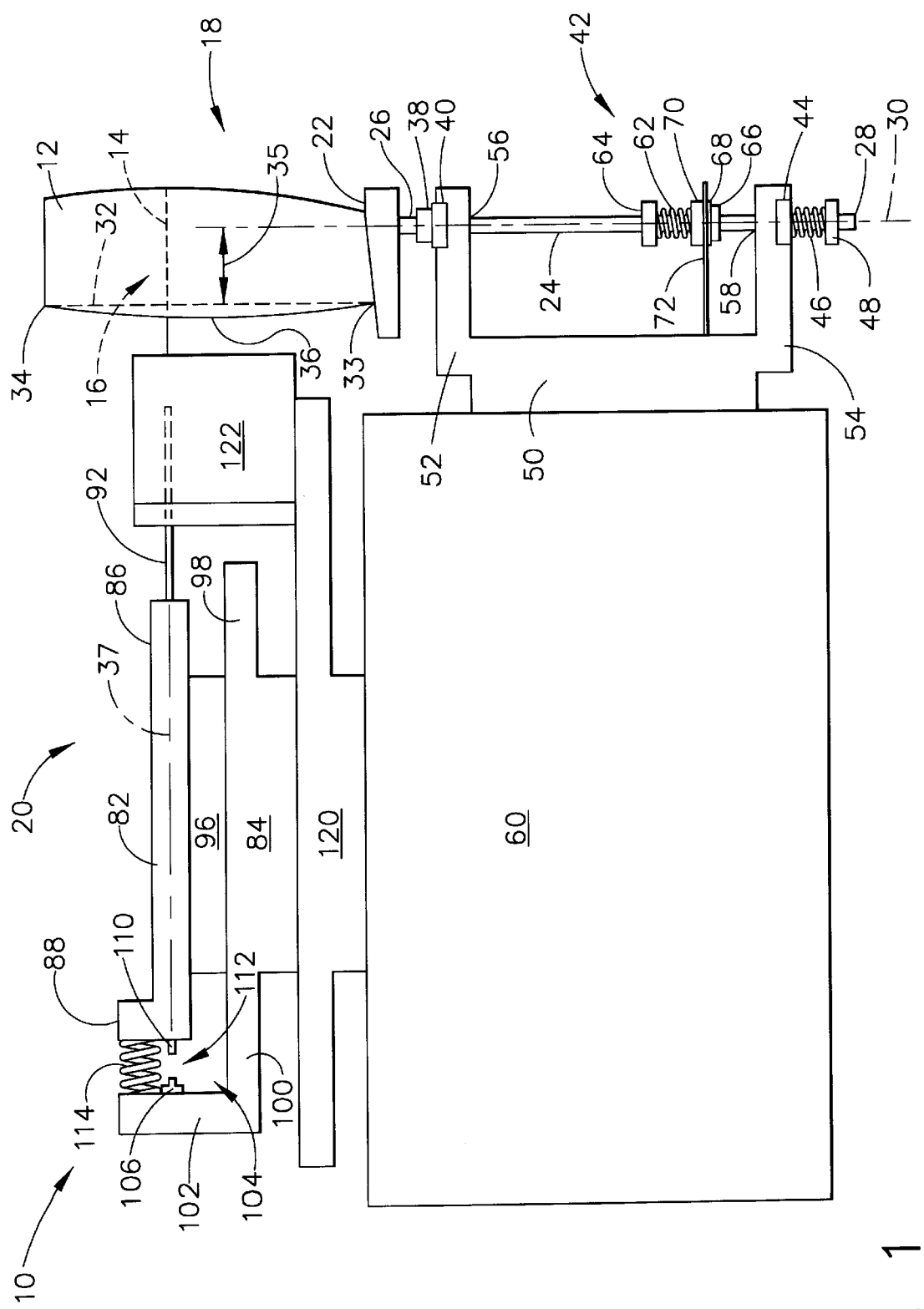
FIG. 1 is a schematic side view of an airfoil coordinate measuring apparatus.

FIG. 1 is a side view of an airfoil coordinate measuring apparatus 10 for measuring a plurality of edge section coordinates (not shown) along an airfoil blade at desired blade spanwise positions. Airfoil blade 12 has a blade chord line 14 extending through a cross section 16 of airfoil blade 12 being measured and includes a blade root (not shown) for mounting airfoil blade 12 to apparatus 10. Cross section 16 and chord line 14 are described in more detail below.

Apparatus 10 further includes a blade engagement apparatus 18 and a measuring apparatus 20. Blade engagement apparatus 18 includes a mounting fixture 22 and a rotation shaft 24 including a first end 26 and a second end 28. Rotation shaft 24 has an axis of symmetry 30 which is substantially perpendicular to blade cross section 16 and substantially parallel to Earth's gravitational field (not shown) to minimize the tendency of shaft 24 to rotate due to the eccentric load of blade 12 and mounting fixture 22. Blade mounting fixture 22 engages the blade root of airfoil blade 12 and secures airfoil blade 12 to apparatus 10.

Blade mounting fixture 22 secures blade 12 such that a line 32 extending from a blade root edge 33 to a blade tip edge 34 is substantially parallel to axis of symmetry 30. Line 32 is spaced a distance 35 from axis of symmetry 30. Distance 35 is substantially equal to a length of a longest chord line (not shown) of airfoil blade 12. An airfoil blade edge 36 extends from the airfoil blade root to blade tip edge 34. A plane (not shown in FIG. 1) substantially includes line 32 and axis of symmetry 30 and is substantially tangent to a meanline (not shown) of blade cross section 16 at blade edge 36. Positioning rotation shaft 24 at distance 35 in the aforementioned plane allows blade edge 36 at cross section 16 to be positioned substantially symmetrical with respect to a second axis of symmetry 37 (described in detail below) when blade edge 36 is positioned for measurement. Mounting fixture 22 is fixedly mounted to end 26 of rotation shaft 24. Rotation shaft 24 passes through a bearing retainer collar 38, an angular contact ball bearing 40, a friction assembly 42, an angular contact ball bearing 44, a bearing pre-load spring 46, an adjustment collar 48, and terminates at second end 28. Bearing retainer collar 38 includes a set screw (not shown) which fixedly attaches bearing retainer collar 38 to rotation shaft 24. Collar 38 presses against an inner race (not shown) of bearing 40. Bearing pre-load spring 46 presses against an inner race (not shown) of angular contact ball bearing 44 and against adjustment collar 48. A set screw (not shown) in adjustment collar 48 allows collar 48 to be repositioned and reattached to rotation shaft 24 thereby allowing an adjustment of a spring force exerted by bearing pre-load spring 46. Adjustments of the spring force exerted by bearing pre-load spring 46 prevent axial and radial shifts of rotation shaft 24.

Blade elevation slide 50 includes arms 52 and 54 which include openings 56 and 58, respectively. Rotation shaft 24 extends through openings 56 and 58 and is supported by bearings 40 and 44. Outer races (not shown) of bearings 40 and 44 are mounted in openings 56 and 58. Blade elevation slide 50 is slidably mounted to a vibration dampening structure 60 which supports slide 50.

Rotation shaft 24 passes through friction assembly 42 which includes a spring 62, a pair of collars 64 and 66, a friction washer 68, a thrust bearing 70, and a friction plate 72. Friction plate 72 is a thin flexible metal plate mounted to elevation slide 50 perpendicularly to axis of symmetry 30. Collar 66 is circumferentially positioned around rotation shaft 24 such that friction washer 68 makes contact with both friction plate 72 and collar 66. Collar 64 is positioned circumferentially around rotation shaft 24 to compress spring 62 against ball thrust bearing 70. Ball thrust bearing 70 presses against friction plate 72 and prevents undesired rotational friction between spring 62 and friction plate 72. A set screw (not shown) in collar 64 allows collar 64 to be repositioned and reattached to rotation shaft 24 thereby adjusting a compression of spring 62 and controlling the amount of rotational friction applied to rotation shaft 24 by friction plate 72.

Blade elevation slide 50 is motorized to travel in a direction substantially parallel to axis of symmetry 30. Blade elevation slide 50 is controlled by a computer (not shown) which elevates airfoil blade 12 in a direction substantially parallel to axis of symmetry 30 for a measurement to be taken.

Measuring apparatus 20 includes a first alignment slide 82 and a second alignment slide 84. First alignment slide 82 includes a first end 86, a second end 88, and axis of symmetry 37 which is substantially perpendicular to axis of symmetry 30 and which passes through first end 86 and second end 88. First alignment slide 82 also includes a blade edge alignment tool 92 mounted in close proximity to first end 86 and including a "V" shaped notch 94 (shown in FIG. 2) which extends towards airfoil blade 12. Notch 94 engages airfoil blade 12 and rotates airfoil blade 12 properly for measuring. First alignment slide 82 is slidably mounted to a slide bearing 96 which is free moving, as described below, in a direction parallel to axis of symmetry 37.

Second alignment slide 84 includes a first end 98 and a second end 100 and slidably supports slide bearing 96. Second alignment slide 84 is motorized to move in a direction substantially parallel to axis of symmetry 37 and is controlled by a computer (not shown). Second alignment slide 84 includes an arm 102 which extends from second alignment slide 84 perpendicularly to axis of symmetry 37.

A limit switch assembly 104 includes an "OFF" mode and an "ON" mode and is positioned on apparatus 10 in close proximity to first alignment slide second end 88 and second alignment slide second end 100. Limit switch assembly 104 includes a switch 106 and an adjustable switch actuator 110. Switch 106 is mounted on arm 102 and extends into a gap 112 between first alignment slide 82 and arm 102. Switch actuator 110 is mounted on first alignment slide second end 88. Limit switch assembly 104 also includes a force spring 114 which spans gap 112 between arm 102 and first alignment slide 82. Spring 114 is biased to maintain switch assembly 104 in an "OFF" mode, as shown in FIG. 1. Switch actuator 110 is adjusted to engage switch 106 when force spring 114 is compressed causing limit switch assembly 104 to be in an "ON" mode. Adjustment of switch actuator 110 changes the amount of force necessary from spring 114 to cause switch assembly 104 to switch from the "OFF" mode to the "ON" mode.

Apparatus 10 also includes motorized measurement slide 120, which is slidably mounted to vibration dampening structure 60, and second alignment slide 84, which is motorized and slidably mounted to measurement slide 120. Both measurement slide 120 and second alignment slide 84 are controlled by the computer which controls movement in a direction substantially parallel to axis of symmetry 37.

Figure 2:
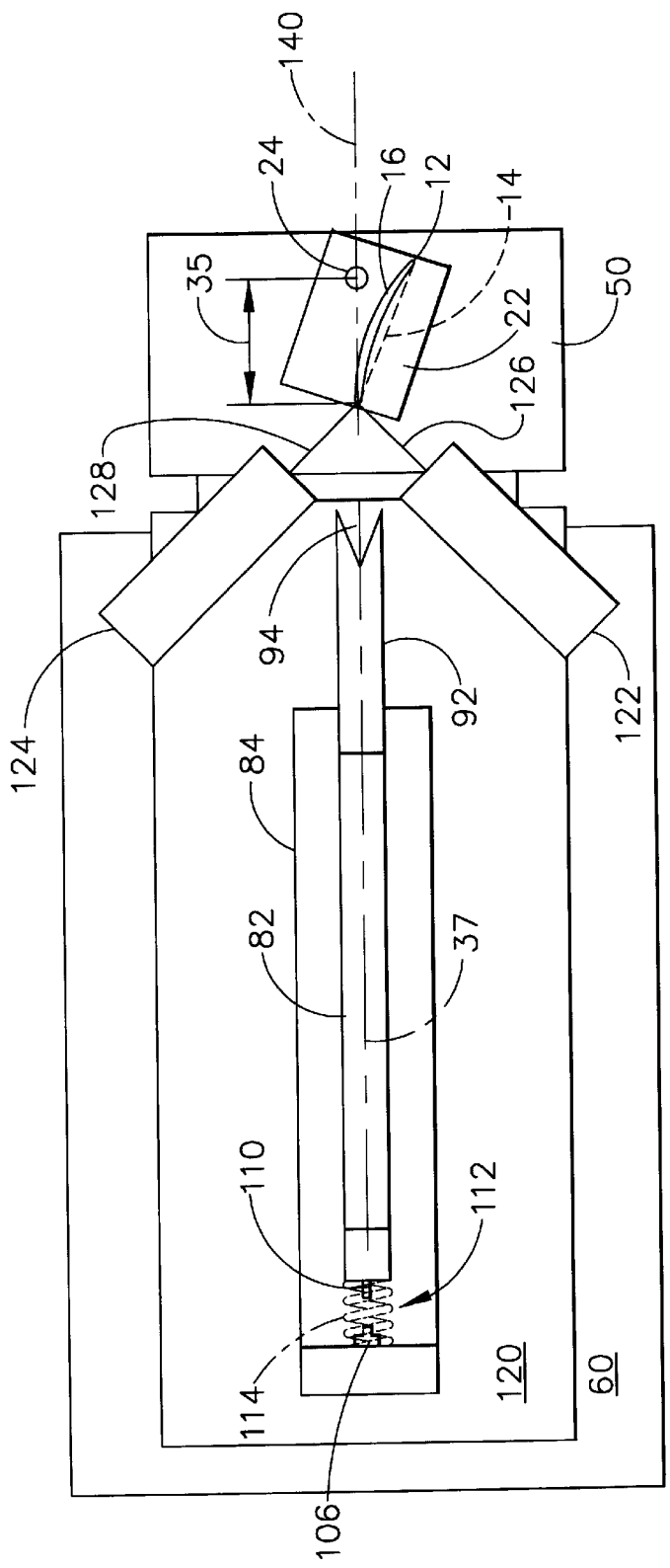
FIG. 2 is a schematic plan view of the airfoil coordinate measuring apparatus shown in FIG. 1.

FIG. 2 is a plan view of airfoil coordinate measuring apparatus 10. A pair of laser displacement sensors 122 and 124 are mounted to measurement slide 120. Each laser displacement sensor 122 and 124 is mounted to emit a laser energy signal 126 and 128 towards airfoil blade 12 at an angle of about 45 degrees relative to axis of symmetry 37. Each laser displacement sensor 122 and 124 is also mounted such that the center of each measuring range of laser displacement sensors 122 and 124 is located substantially at the same position on axis of symmetry 37. Laser displacement sensors 122 and 124 cannot be operated simultaneously as reflected laser energy from one laser sensor will disrupt the other laser sensor. Laser displacement sensor 122 deactivates when laser sensor 124 is emitting and performing measurements. Laser displacement sensor 124 operates similarly. Laser displacement sensors 122 and 124 continuously output a voltage that is linearly proportional to the distance to the nearest object in its beam path. The computer measures this voltage and converts the voltage to a distance.

A plane 140 substantially includes axis of symmetry 30 (shown in FIG. 1) and is substantially tangent to a meanline (not shown) of blade cross section 16 at blade edge 36. Positioning rotation shaft 24 at distance 35 in plane 140 allows cross section 16 at blade edge 36 to be positioned substantially symmetrical with respect to axis of symmetry 37 when blade edge 36 is positioned for measurement.

In another embodiment, laser sensor 122 and laser sensor 124 are mounted so that laser energy signal 126 and laser energy signal 128 are directed toward airfoil blade 12 at an angle of greater than 45 degrees relative to axis of symmetry 37. In this embodiment, a blade engagement tool (not shown) is used to rotate airfoil blade 12 such that blade chord line 14 is substantially parallel to axis of symmetry 37. This embodiment allows measurement of an entire cross section of airfoil blade 12 but does not permit detailed measurement of the airfoil blade edge (not shown in FIG. 2).

In operation, blade 12 is inserted in blade mounting fixture 22. Blade mounting fixture 22 is manually rotated so that the airfoil blade edge at the desired blade spanwise section to be measured is near axis of symmetry 37. Measurement slide 120 is initially positioned by the computer such that the intersection of emitted laser beams 126 and 128 of laser displacement sensors 122 and 124, respectively, occurs in close proximity to the airfoil blade edge (not shown in FIG. 2). The computer drives second alignment slide 84 toward airfoil blade 12. As second alignment slide 84 is moving, force spring 114 causes first alignment slide 82 to move in a direction substantially parallel to second alignment slide 84. Blade edge alignment tool 92 is mounted to first end 86 of first alignment slide 82 and includes "V" shaped notch 94. The computer controlled movement of second alignment slide 84 toward blade 12 causes first alignment slide 82 and notch 94 to be driven toward blade 12. Notch 94 captures the blade edge of airfoil blade 12. As first alignment slide 82 is forced towards blade 12, the edge of blade 12 is moved towards line of symmetry 37 causing rotation shaft 24 to rotate, overcoming the restraining torque of friction assembly 42. When notch 94 bottoms out on the airfoil blade edge of airfoil blade 12, force spring 114 is compressed and switch actuator 110 contacts switch 106 causing limit switch assembly 104 to be in the "ON" mode. The "ON" mode of limit switch assembly 104 is sensed by the computer, and the computer stops movement of second alignment slide 84. The computer retracts second alignment slide 84 which causes first alignment slide 82 and attached alignment tool 92 to retract via force spring 114. Airfoil blade 12 is now properly positioned for measurement of the edge section coordinates.

After second alignment slide 84 is retracted, the computer activates laser displacement sensor 122 and the computer drives measurement slide 120 towards blade 12 in a direction substantially parallel to axis of symmetry 37. As measurement slide 120 is driven towards airfoil blade 12, laser displacement sensor 122 emits laser energy signal 126 towards airfoil blade 12, and receives a reflected signal (not shown) from airfoil blade 12. The output voltage of sensor 122 and position of slide 120 are repeatedly recorded by the computer as slide 120 is driven towards airfoil blade 12.

Once measurement slide 120 has traveled a desired distance, the computer then deactivates laser sensor 122 and activates laser sensor 124. The computer then reverses the direction of movement of measurement slide 120 and retracts slide 120 while repeatedly recording position of measurement slide 120 and output voltage of sensor 124 as it emits laser energy signal 128 towards airfoil blade 12, and receives a reflected signal from airfoil blade 12. After measurement slide 120 has returned to its starting position, the computer then calculates the section edge coordinates from the recorded information and the known geometry of the measurement system.

The computer drives blade elevation slide 50 to move airfoil blade 12 in a direction substantially parallel to axis of symmetry 30 so that the edge section coordinates of the next section of airfoil blade 12 can be measured.

This elevating and measurement process is repeated until the edge section coordinates at the desired spanwise locations are recorded, and then the computer retracts blade elevation slide 50 to an original position so that airfoil blade 12 can be removed from apparatus 10.

The above described measuring apparatus for measuring airfoil blades is costeffective and highly accurate. The apparatus includes a blade engagement tool which, in combination with a set of alignment slides, automatically and reliably positions the airfoil blade being measured. Furthermore, the apparatus uses positioning equipment that is inexpensive and reliable when compared to other airfoil blade measuring equipment currently in use. As such, a cost effective and accurate airfoil measuring apparatus is provided.

While the invention has been described in terms of various specific embodiments, those skilled in the art will recognize that the invention can be practiced with modification within the spirit and scope of the claims.

What is claimed is:

1. A method for measuring airfoil blade section coordinates with an apparatus, the apparatus including a blade engagement system including a blade elevation slide, a blade mounting fixture, and a rotation shaft connected to the blade elevation slide and to the blade mounting fixture, and a measuring system including a blade alignment tool, a first alignment slide having an axis of symmetry, a second alignment slide in slidable contact with the first alignment slide, a measurement slide in slidable contact with the second alignment slide, and a plurality of laser displacement sensors positioned on the measurement slide to measure the airfoil blade section coordinates, said method comprising the steps of:

securing an airfoil blade to the blade engagement system; and using the measuring system to automatically measure the airfoil blade.

2. A method in accordance with claim 1 further comprising the step of mounting the blade engagement system and the measuring system to a vibration dampening structure.

3. A method in accordance with claim 1 wherein the blade elevation slide has a first direction of travel and the second alignment slide has a second direction of travel and an axis of symmetry generally parallel to the second direction of travel, said method further comprising the step of controlling the first direction of travel of the blade elevation slide, the second direction of travel of the second alignment slide, and second direction of travel of the measurement slide with a computer.

4. A method in accordance with claim 3 wherein the plurality of displacement sensors are configured to receive and emit laser energy signals so that the emitted laser energy signals intersect at the airfoil blade, said method further comprising the step of mounting the plurality of laser displacement sensors at about 45 degrees relative to the first alignment slide axis of symmetry.

5. A method in accordance with claim 4 wherein the airfoil blade has an airfoil blade edge, said method further comprising the step of rotating the airfoil blade edge with the blade edge alignment tool such that the airfoil blade edge is substantially symmetrical with respect to the first alignment slide axis of symmetry.

6. A method in accordance with claim 1 wherein the measuring system includes a limit switch assembly including a switch attached to the second alignment slide, a limit switch actuator attached to the first alignment slide, and a force spring attached between the first alignment slide and the second alignment slide, said method further comprising the step of adjusting the limit switch actuator to activate the switch when the blade alignment tool has bottomed out on the airfoil blade.

7. A method in accordance with claim 1 wherein the blade engagement system further includes a friction assembly which prevents unrestrained rotation of the rotation shaft, said method further comprising the step of adjusting the friction assembly to permit the rotation shaft to be rotated by the blade edge alignment tool and the rotation shaft position to remain stationary when the blade edge alignment tool is retracted.

8. A method in accordance with claim 4 wherein the airfoil blade includes a blade chord line which extends through each section of the airfoil blade being measured including a leading edge, said method further comprising the step of rotating the airfoil blade edge with the blade edge alignment tool such that the blade chord line at the leading edge of the airfoil blade being measured is coincident with the axis of symmetry of the first alignment slide.

9. A method in accordance with claim 3 wherein the first alignment slide has an axis of symmetry generally parallel to the second direction of travel, said method further comprising the step of mounting the laser displacement sensors to the apparatus at greater than 45 degrees relative to the first alignment slide axis of symmetry.

10. Apparatus for measuring airfoil blade section coordinates of an airfoil blade having an airfoil blade edge, said apparatus comprising:

a blade engagement apparatus configured to receive the airfoil blade, said blade engagement apparatus comprising a blade elevation slide having a first direction of travel, a blade mounting fixture, and a rotation shaft connected to said blade elevation slide and to said blade mounting fixture; and a measuring apparatus configured to measure the airfoil blade section coordinates, said measuring apparatus comprising a first alignment slide having a second direction of travel, a blade edge alignment tool configured to align the airfoil blade edge, and a plurality of laser displacement sensors positioned to measure the airfoil blade, said blade edge alignment tool mounted to said alignment slide, said first alignment slide comprising an axis of symmetry.

11. Apparatus in accordance with claim 10 wherein said measuring apparatus further comprises a second alignment slide for positioning said first alignment slide, said second alignment slide in slidable contact with said first alignment slide.

12. Apparatus in accordance with claim 11 wherein said measuring apparatus further comprises a measurement slide, said sensors mounted on said measurement slide, said measurement slide in slidable contact with said second alignment slide.

13. Apparatus in accordance with claim 10 wherein said plurality of laser displacement sensors are configured to receive and emit laser energy signals, said plurality of laser displacement sensors comprising two laser displacement sensors, said emitted laser energy signals from said two displacement sensors intersect at a common point on said axis of symmetry of said first alignment slide.

14. Apparatus in accordance with claim 13 wherein said laser displacement sensors further comprise a measuring range, said emitted laser energy signals from said two displacement sensors intersect at a center of said measuring range of each displacement sensor.

15. Apparatus in accordance with claim 12 wherein said first alignment slide has an axis of symmetry generally parallel to said second direction of travel, said laser displacement sensors mounted to said measurement slide at about 45 degrees relative to said first alignment slide axis of symmetry.

16. Apparatus in accordance with claim 11 wherein said measuring apparatus further comprises a limit stop switch assembly for monitoring movement of said first alignment slide relative to said second alignment slide, said limit stop switch assembly comprising a first switch mounted on said second alignment slide, an adjustable limit switch actuator mounted on said first alignment slide, and a force spring attached between said first alignment slide and said second alignment slide.

17. Apparatus in accordance with claim 10 further comprising a vibration dampening structure supporting said measuring apparatus and said blade engagement apparatus, and a computer configured to control said second direction of travel of said second alignment slide, said second direction of travel of said measurement slide, and said first direction of travel of said blade elevation slide.

18. Apparatus in accordance with claim 14 wherein said rotation shaft is configured to rotate such that an airfoil blade cross section at the blade edge being measured is substantially symmetrical with respect to said first alignment slide axis of symmetry, said rotation shaft having an axis of symmetry generally parallel to said first direction of travel.

19. Apparatus in accordance with claim 12 wherein said first alignment slide has an axis of symmetry generally parallel to said second direction of travel, said laser displacement sensors mounted to said measurement slide at greater than 45 degrees relative to said first alignment slide axis of symmetry.

20. Apparatus in accordance with claim 13 wherein the airfoil blade has a blade chord line extending through each section of the airfoil blade being measured, said rotation shaft configured to rotate the airfoil blade edge such that a portion of the blade chord line is substantially coincident with said intersection between said emitted laser energy signals.

* * * * *